United States Patent Office 3,767,600
Patented Oct. 23, 1973

3,767,600
POROUS POLYMERS WITH IONIC FUNCTIONAL GROUPS BASED ON POLYFUNCTIONAL METHACRYLATES
Robert L. Albright, Churchville, Pa., assignor to Rohm and Haas Company, Philadelphia, Pa.
No Drawing. Continuation-in-part of application Ser. No. 846,271, July 30, 1969, now Patent No. 3,663,467, which is a continuation-in-part of abandoned application Ser. No. 756,392, Aug. 30, 1968. This application May 11, 1972, Ser. No. 254,816
The portion of the term of the patent subsequent to May 16, 1989, has been disclaimed
Int. Cl. C08f *15/16, 27/00, 47/08*
U.S. Cl. 260—2.2 R
8 Claims

ABSTRACT OF THE DISCLOSURE

Porous polymers containing a polyfunctional methacrylate such as trimethylolpropane trimethyacrylate have ion exchange properties when ionic functional groups are incorporated into the resin structure.

---

This application is a continuation-in-part of my copending application, Ser. No. 846,271, filed July 30, 1969, now Pat. No. 3,663,467, which in turn is a continuation-in-part of application Ser. No. 756,392, filed Aug. 30, 1968, and now abandoned.

This invention relates to porous, macroreticular polymers of trimethylolpropane trimethacrylate (which hereinafter may be referred to as TMPTMA), and related polyfunctional methacrylates, which are useful as adsorbents and/or as ion exchange resins.

Macroreticular resins or polymers are known to the art and are typically aromatic in character, for example, the styrene divinylbenzene crosslinked macroreticular resins represent a class of well known and presently commercially available materials. These macroreticular resins contain a significant non-gel porosity in addition to the conventional gel porosity. Methods for preparation of these macroreticular resins are disclosed in copending patent application 749,526 filed July 18, 1958 (Meitzner et al.) and in corresponding British Pats. 932,125, 932,126 and in U.S. Pats. 3,275,548 and 3,357,158.

Briefly, the disclosure of the above application and patents teach that macroreticular resins may be prepared by polymerizing monomers which can crosslink in the presence of a phase separating or phase extending solvent or mixture of solvents that is miscible with the monomers, but which does not dissolve the polymer. The solvent which is usually present in an amount of from about 0.2 to 20 times the weight of the polymerizing monomers must be nonpolymerizable with the monomers, but not dissolve the polymer. The size of the pores in the polymer and the porosity are somewhat dependent upon the kind of solvent employed, e.g., whether an aromatic hydrocarbon such as toluene or ethylbenzene or an aliphatic compound such as heptane or an alcohol such as an isoamyl alcohol, or a mixture of such compounds is employed. The polymerization is usually carried out in aqueous suspension at temperatures between about 40° to 120° C. and at atmospheric, sub-atmospheric or super-atmospheric pressure, thereby producing polymer beads or granules. These beads or granules possess a network of microscopic channels extending through the mass and while these microscopic channels are very small, they are large in comparison with the pores of conventional crosslinked gels. Typically, these macroreticular polymers have a surface area of at least 5 sq. meters per gram and have pores larger than 15 to 20 A. units. The beads are also usually produced in an overall range of particle size of about 10 to 900 microns.

It has now been discovered that if the porous macroreticular resins or polymers are essentially all aliphatic in character and crosslinked with a polyfunctional methacrylate (containing at least three methacrylate groups) there are produced sorbent products of superior and improved hydrolytic stability, higher wet density, good hydraulic characteristics and ion exchange resins with improved properties when the resin or polymer contains suitable ionic functional groups or suitable ion exchange sites. Moreover, the aliphatic porous macroreticular polymers of the present invention are effective adsorbents in both aqueous and nonaqueous media, in contrast to prior art materials. The preferred polyfunctional methacrylate is trimethylolpropane trimethacrylate or pentaerythritol tetramethacrylate. However, the trimethacrylate of glycerol, glucose pentamethacrylate, soribtol hexamethacrylate and the polyfunctional methacrylates of polyhydric alcohols of 3 to 6 carbon atoms in chain length may also be used. These polyfunctional methacrylates must contain at least three methacrylate groups as heretofore noted. Sutro polyols which are commercially available mixtures of essentially straight chain polyhydric alcohols of 3 to 6 carbon atoms may be used as the source of the polyhydric alcohol.

The crosslinked, porous, macroreticular polymers, containing ion exchange groups, of the present invention are prepared in the form of rigid, water-insoluble, white or opaque beads with particle sizes in the range of about 10 to 900 microns. In terms of mesh size (U.S. Standard Screen) it is preferred that the particle size be in the range of about 20 to 60 mesh. The porous, macroreticular polymers or ion exchange resins of the present invention have a surface area of at least about 5 sq. meters per gram, with the upper limit ranging as high as 2000 sq. meters per gram. The preferred surface area is in the range of 25 to 500 sq. meters per gram. The porous polymers of the present invention also have pores with an average pore diameter of at least 15 to 20 angstrom units (A.)

The polymers of the present invention typically contain at least 2%, more preferably at least 5%, and most preferably at least 10% of the polyfunctional methacrylate and can contain up to 100% of said polyfunctional methacrylate, all parts being on a weight basis. Typical aliphatic, non-aromatic, monoethylenically unsaturated monomers which may be copolymerized with the polyfunctional methacrylate include, for example, ethylene, isobutylene, acrylonitrile, methacrylonitrile, acrylamide, methacrylamide, diacetone acrylamide, vinyl esters, including vinyl chloride, vinyl acetate, vinyl propionate, vinyl butyrate, vinyl laurate, vinyl ketones including vinyl methyl ketone, vinyl ethyl ketone, vinyl isopropyl ketone, vinyl n-butyl ketone, vinyl hexyl ketone, vinyl octyl ketone, methyl isopropenyl ketone, vinyl ethers including vinyl methyl ether, vinyl ethyl ether, vinyl propyl ether, vinyl isobutyl ether, vinylidene compounds including vinylidene chloride, bromide, or bromochloride, esters of acrylic acid and methacrylic acid such as the methyl, ethyl, 2-chloroethyl, propyl, isopropyl, n-butyl, isobutyl, t-butyl, sec-butyl, amyl, hexyl, glycidyl, ethoxyethyl, cyclohexyl, octyl, 2-ethylhexyl, decyl, dodecyl, hexadecyl and octadecyl esters of these acids, hydroxyalkyl methacrylates and acrylates such as hydroxyethyl methacrylate and hydroxypropyl methacrylate, also the corresponding neutral or half-acid half-esters of the unsaturated dicarboxylic acids including itaconic, citraconic, aconitic, fumaric, and maleic acids, substituted acrylamides, such as N-monoalkyl, -N,N- dialkyl-, and N-dialkylaminoalkylacrylamides or methacrylamides where the alkyl groups may have from one to eighteen carbon atoms, such as methyl, ethyl, isopropyl, butyl, hexyl, cyclohexyl, octyl, dodecyl, hexadecyl and octadecyl aminoalkyl esters of acrylic or methacrylic acid, such as $\beta$-dimethylaminoethyl, $\beta$-diethylaminoethyl, or 6-dimethylaminohexyl acrylates and methacrylates, alkylthioethyl methacrylates and acrylates such as ethylthioethyl methacrylate, vinylpyridines, such as 2-vinylpyridine, 4-vinylpyridine, 2-methyl-5-vinylpyridine, and so on. There may also be copolymerized with the polyfunctional methacrylates hereinbefore mentioned a difunctional methacrylate such as ethylene glycol dimethacrylate or trimethylolpropane dimethacrylate, but the difunctional methacrylate must not be present in an amount more than about 25% by weight, and preferably not more than 10–15% by weight, based on the weight of the polyfunctional methacrylate.

As heretofore mentioned, it is preferred to use a suspension polymerization technique in the preparation of the essentially all-aliphatic polymers or ion exchange resins. The polymerization is carried out at temperatures between about 40° C. and 120° C., and at atmospheric, sub-atmospheric or super-atmospheric pressure, thereby producing polymer beads or granules. A variety of suspending agents may be used to aid in the suspension of the monomer-solvent mixture in an aqueous medium as particles of the desired size. Typical of these materials, a great number of which are known in the art, are water soluble polymeric materials such as poly(vinyl alcohol), hydroxyethyl celluose, methyl cellulose, starch and modified starch, hydrolyzed ethylene-maleic anhydride polymers, hydrolyzed styrene-maleic anhydride copolymers, acrylamide-sodium acrylate copolymers, polyvinylimidazoline polymers and salts thereof, and the like. Other well known suspending agents are finely divided solids such as magnesium silicate wax and finely divided silica sold under the name Cab-O-Sil, finely divided clays and the like. Also sometimes useful are the conventional surface active materials such as octylphenoxypolyethoxyethanol, sodium lauryl sulfate, sodium stearate and others. Suitable catalysts, usually in the range of 0.01% to 3% by weight with reference to the weight of the monomer or monomer mixture, may be used to provide free radical initiation in the polymerization reaction. Examples include benzoyl peroxide, lauroyl peroxide, t-butyl hydroperoxide, t-butyl perbenzoate cumene peroxide, and azo catalysts such as azodiisobutyronitrile, azodiisobutyramide, etc. Suitable phase-extending or phase separating solvents, include, for example, methyl isobutyl carbinol, methyl isobutyl ketone, n-butyl acetate, xylene, toluene, iso-octane, chlorobenzene, as well as others known to the art.

To assist those skilled in the art to practice the present invention, the following procedures or modes of operation are suggested by way of illustration, parts and percentages being by weight unless otherwise specifically noted.

(1)(a) Equipment.—All the procedures are carried out with the same equipment except for variations in flask size. Three-necked, round-bottomed flasks of sizes varying from 500 ml. of twelve liters are employed for the preparation of the macroreticular, porous copolymers in quantities from 100 grams to 1500 grams. The standard tapered necks are fitted with a stainless steel, two paddled stirrer; a reflux condenser; a nitrogen inlet; and a long-stemmed, three inch immersion thermometer to which is attached a conductance-sensing head that is connected to a pot lifter via an electronic relay for automatic temperature control. The pot lifter, which carried a heating mantle and an air nozzle for both heating and cooling, respectively, and the electronic components of the automatic temperature controlling system are products of Instruments for Research and Industry, Cheltenham, Pa. The stirring motor for maintaining a constant speed of agitation during droplet formation and polymerization is a con-torque with an adjustable speed of 0 to 750 r.p.m. manufactured by Eberbach Corporation, Ann Arbor, Mich.

(1) (b) Into a 500 ml. flask are placed 208.6 grams of aqueous liquid and 101.0 grams of immiscible organic liquid containing the monomers, so that the weight ratio of aqueous to organic phases is approximately two to one. The composition of the aqueous phase is 200 grams of water, 6 grams of sodium chloride (3.0 wt. percent of water), 0.2 gram of gelatin (0.2 wt. percent of organic phase), and 2.4 grams of 12.5 wt. percent sodium polyacrylate in water (0.3 wt. percent of organic phase is sodium polyacrylate). The composition of the organic layer is 25 grams (0.2904 mole) methyl acrylate inhibited with 200 p.p.m. monomethyl ether of hydroquinone, 25 grams (0.07388 mole) commercial trimethylolpropane trimethacrylate which contains 89.7 wt. percent trimethylolpropane trimethacrylate and 10.3 wt. percent dimethacrylate ester, 50 grams (0.4894 mole, 50 wt. percent or organic phase) methyl isobutyl carbinol (MIBC), and 0.5 grams (1.0% of monomer weight) lauroyl peroxide. In this procedure the molar ratio of methyl acrylate to the trifunctional crosslinker is 3.93 and the molar ratio of monomer solvent (MIBC) to copolymer is 1.3435. After introduction of the aqueous solution, sufficient concentrated aqueous ammonium hydroxide (several drops) is added to raise the pH to within the range of 8 to 9. After flushing the system with nitrogen, the immiscible mixture is stirred at ambient temperature (about 25° C.) at 145 r.p.m. with as many on-off stirring cycles as necessary to disperse completely all the organic liquid into small droplets (p.2 to 0.5 mm. diameters) in the aqueous layer. When the system in the absence of agitation no longer formed a separate organic layer distinct from the droplet and water layers, the dispersion is heated in an atmosphere of nitrogen at 65° C. for twenty hours with the same agitation used to develop the droplets in order to polymerize the liquid monomer into solid spheres. The product, a copolymer of 44.8% TMPTMA, 5.2% Trimethylolpropane dimethacrylate (TMPDMA), and 50% methyl acrylate, is cooled to ambient temperature, washed and dried. The yield of dried product is 45 grams or 90% of theory. The copolymer's physical properties are tabulated below:

| | |
|---|---|
| Appearance | (¹) |
| Apparent density, g. ml.$^{-1}$ | 0.590 |
| Skeletal density, g. ml.$^{-1}$ | 1.229 |
| Porosity, ml. pores (ml. beads)$^{-1}$ | 0.520 |
| Internal surface area, m.$^2$ g.$^{-1}$ | 77 |
| Average pore diameter, A. | 456 |

[1] Opaque white.

(2) (a) Porous copolymer beads are prepared following the general procedure as described in Example 1, but instead there is used a mixture of 25 grams (0.347 mole) of acrylic acid, 25 grams (0.0739 mole) commercial trimethylolpropane trimethacrylate, which is 89.7% triester and 10.3% diester, 0.5 grams lauroyl peroxide, and 50 grams (0.430 mole, 50 wt. percent of the organic phase) of n-butyl acetate. The aqueous phase for formation of the dispersion is composed of 150 grams of water, 61.3 grams of sodium chloride (a saturated salt solution), and 2.1 grams of a 30 wt. percent aqueous solution of sodium polyacrylate. The pG of the aqueous phase is adjusted to 8 to 9 prior to development of the dispersion. Monomer droplets of the proper size are formed at a stirring speed of 215 r.p.m. in a 500 ml. flask. The yield of washed, dried copolymer is 47 grams of 94% of theory. The chemical and physical properties of the ion exchange resin (4)(a) Following the teaching of 3(a) above, ion exchange properties are developed in the TMPTMA copolymers and the results are tabulated below in Table I:

TABLE I

| Copolymer composition, percent | | | Phase extender | Conc phase extender, percent | Post treatment | Elemental analysis, percent | | | | Capacity, me g. g.$^{-1}$ | | Percent solids |
|---|---|---|---|---|---|---|---|---|---|---|---|---|
| TMP-TMA | TMP-DMA | MA[1] | | | | C | H | O | N | Anion exchange | Cation exchange | |
| 46 | 4 | 50 | MIBC | 50 | DMAPA[2] | 58.10 | 8.53 | 27.30 | 3.99 | 1.96, 1.46 | 1.71, 2.36 | 34.7, 35.9 |
| 46 | 4 | 50 | MIBC | 50 | DMAPA | 58.00 | 8.43 | 25.76 | 5.64 | 2.38 | 3.64 | 33.9 |
| 46 | 4 | 50 | Toluene | 50 | Hydrolysis | 54.40 | 7.13 | 33.61 | | | 5.74 | 40.4 |
| 46 | 4 | 50 | do | 40 | Acidolysis[3] | 54.55 | 6.75 | 35.40 | | | 4.80 | 48.3 |

[1] MA=Methyl acrylate.
[2] DMAPA=3-dimethylamino propylamine (This gives resins with weak base, amine, capacity or functionality).
[3] Acidolysis is carried out with acetic acid with sulfuric acid as catalyst. Acidolysis or hydrolysis converts the methyl acrylate to acrylic acid to give a weak acid cation exchange resin.

which has weak acid (carboxylic) capacity or functionality are given below:

Appearance _____ ([1])
Apparent density, g. ml.$^{-1}$ _____ 0.729
Skeletal density, g. ml.$^{-1}$ _____ 1.326
Porosity, ml. pores (ml. beads)$^{-1}$ _____ 0.450
Surface area, m.$^2$ g.$^{-1}$ _____ 32
Average pore diameter, A. _____ 772
Carboxylic acid capacity, meq. g.$^{-1}$ _____ 5.87

[1] Shiny white opaque beads.

(3) (a) Post reaction of macroreticular TMPTMA copolymer.—One half gram equivalent, 86.1 grams, of a porous copolymer composed of 50 wt. percent methyl acrylate, 46 wt. percent trimethylolpropane trimethacrylate, and 4 wt. percent trimethylolpropane dimethacrylate is treated in 2-propanol under nitrogen at reflux temperature for 88 hours with a mixture of 149 grams (1.5 moles) 32.27 wt. pecent hydrazine) of aqueous hydrazine solution and of 84.1 grams (1.5 moles) of hydrazine monohydrate. During the reaction period the reflux temperature rises from 85° C. to 120° C. An infrared spectrum of an aliquot of the beads after removal of reagents by treatment with methanol and drying indicated that some reaction had occurred after 16.5 hours. After 16.5 hours the ratio of absorbance of the amide bank (1640 cm.$^{-1}$) of the hydrazine to the ester bank (1720 cm.$^{-1}$) is 0.249. At the end of 88 hours the ratio of the absorbance of the amide band (1635 cm.$^{-1}$) of the hydrazine to the ester band (1705 cm.$^{-1}$) is 1,178. The elemental analysis for nitrogen indicates that the hydrazonolysis of the methyl ester groups in the terpolymer had occurred to the extent of 85.7% of theory, if it is assumed that only the methyl ester groups are reactive and that the equivalent weight of the terpolymer is, as calculated, 172.18. The chemical and physical properties of the porous polymer or ion exchange resin which has hydrazine or weak base capacity or functionality are tabulated below:

Appearance _____ ([1])
Apparent density, g. ml.$^{-1}$ _____ 0.540
Skeletal density, g. ml.$^{-1}$ _____ 1.357
Porosity, ml. pores (ml. beads)$^{-1}$ _____ 0.602
Surface area, m.$^2$ g.$^{-1}$ _____ 53
Average pore diameter, A. _____ 842
Elemental analysis:
    Percent C _____ 46.29
    Percent H _____ 7.71
    Percent O _____ 26.03
    Percent N _____ 13.93

[1] Opaque white.

The physical properties of the starting copolymer are as follows:

Appearance _____ ([1])
Apparent density, g. ml.$^{-1}$ _____ 0.526
Skeletal density, g. ml.$^{-1}$ _____ 1.268
Porosity, ml. pores (ml. beads)$^{-1}$ _____ 0.585
Surface area, m.$^2$ g.$^{-1}$ _____ 79
Average pore diameter, A. _____ 563

[1] Opaque white.

The ion exchange resins of the present invention possess improved physical stability and other improved properties. The weak base resins or polymers may be used in applications such as deacidification, deionization of water and decolorizing applications. The weak acid resins or polymers may be used in conventional applications such as water conditioning (dealkalization, caustic scavenging, deionization, etc.).

I claim:
1. A porous, macroreticular essentially all aliphatic ion exchange polymer, or resin, having one or more weak base or weak acid ion exchange sites or groups incorporated therein, said polymer having pores with an average diameter of at least 15 to 20 Angstrom units and a surface area of at least 5 square meters per gram, said polymer being rigid and crosslinked and composed of 2 to 100% by weight of a polyfunctional methacrylate containing at least 3 methacrylate groups.
2. A porous macroreticular ion exchange resin according to claim 1 wherein the polyfunctional methacrylate is trimethylolpropane trimethacrylate or pentaerythritol tetramethacrylate.
3. An ion exchange resin according to claim 2 wherein the porous copolymer contains about 50 weight percent acrylic acid, 46 weight percent trimethylolpropane and 4 weight percent trimethylolpropane dimethacrylate.
4. An ion exchange resin according to claim 2 wherein the weak acid ion exchange sites or groups are carboxyl groups.
5. A composition according to claim 4 wherein the ion exchange resin has a porosity of about 45% and a surface area of about 32 square meters per gram.
6. An ion exchange resin according to claim 2 wherein the ion exchange sites or groups are weak base groups.
7. An ion exchange resin according to claim 6 wherein the ion exchange sites or groups are weak base groups derived from dimethylamino propyl amine.
8. An ion exchange resin according to claim 6 wherein the ion exchange sites or groups are weak base groups derived from an amino compound other than dimethylaminoethylmethacrylate.

References Cited
UNITED STATES PATENTS

| | | | |
|---|---|---|---|
| 3,220,960 | 11/1965 | Wichterle | 260—2.5 M |
| 3,275,548 | 9/1966 | Walters | 210—24 |
| 3,357,158 | 12/1967 | Hollis | 260—2.5 R |
| 3,418,262 | 12/1968 | Werotte et al. | 260—2.5 B |
| 3,663,467 | 5/1972 | Albright | 260—2.5 B |

OTHER REFERENCES

Rohm & Haas Company Bulletin CM-32, June 1969.
Rohm & Haas Company Bulletin SP-237, March 1967.

WILBERT J. BRIGGS, Sr., Primary Examiner

U.S. Cl. X.R.

210—24, 37, 38, 500; 260—2.1 R, 2.1 E, 2.5 B, 2.5 R, 2.5 M, 79.5 C, 80.81, 86.1 E, 89.5 R, 89.5 S